US008005767B1

(12) United States Patent
Cassella

(10) Patent No.: US 8,005,767 B1
(45) Date of Patent: Aug. 23, 2011

(54) SYSTEM AND METHOD OF CLASSIFYING EVENTS

(75) Inventor: Vincent A. Cassella, W. Springfield, VA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 1013 days.

(21) Appl. No.: 11/756,690

(22) Filed: Jun. 1, 2007

Related U.S. Application Data

(60) Provisional application No. 60/889,550, filed on Feb. 13, 2007.

(51) Int. Cl.
*G06F 15/18* (2006.01)
*G06F 17/00* (2006.01)

(52) U.S. Cl. .................. 706/12; 706/48; 706/45

(58) Field of Classification Search .................. None
See application file for complete search history.

(56) References Cited

OTHER PUBLICATIONS

McEuen, M., "Expert Object Recognition in Video", Rochester Institute of Technology, pp. 1-93, Oct. 2005.*
Yang et al., K., "A PCA-based Similarity Measure for Multivariate Time Series", MMDB '04, pp. 65-74, Nov. 13, 2004.*
Loui et al., A., "Automatic Image Event Segmentation and Quality Screening for Albuming Applications", IEEE International Conference on Multimedia and Expo, pp. 1-4, Jul. 2000.*
Carlson et al., B., "Covariance Matrix Estimation Errors and Diagonal Loading in Adaptive Arrays", IEEE Transactions on Aerospace and Electronic Systems, vol. 24, No. 4, pp. 397-401, Jul. 1988.*
Oka et al., M., "Eigen Co-occurrence Matrix Method for Masquerade Detection", Proceedings of the 7th JSSST SIGSYS, pp. 1-7, 2004.*
Siskind et al., J., "A Maximum-Likelihood Approach to Visual Event Classification", ECCV '96, pp. 347-360, 1996.*

* cited by examiner

*Primary Examiner* — Jeffrey A Gaffin
*Assistant Examiner* — Adrian Kennedy
(74) *Attorney, Agent, or Firm* — Amy Ressing; Suresh Koshy

(57) ABSTRACT

The present invention enables identification of events such as target. From training target event data the present a very large number of clusters are formed for each class based on Euclidean distance using a repetitive k-means clustering process. Features from each cluster are identified by extracting out their dominant eigenvectors. Once all of the dominant eigenvectors have been identified, they define the relevant space of the cluster. New target event data is compared to each cluster by projecting it onto the relevant and noise spaces. The more the data lies within the relevant space and the less it lies within the noise space the more similar the data is to a cluster. The new target event data is then classified based on the training target event data.

6 Claims, 11 Drawing Sheets

SYSTEM AND METHOD OF CLASSIFYING EVENTS

CROSS-REFERENCE TO RELATED APPLICATIONS

This application claims the benefit of priority under 35 U.S.C. §119(e) to provisional patent application Ser. No. 60/889,550, filed Feb. 13, 2007.

BACKGROUND OF THE INVENTION

Classification is an important field of study in many disciplines. Human beings do this naturally all the time; medical doctors use their skills to identify diseases, inspection lineworkers use them to identify defective manufactured parts, police use them to find wanted criminals, etc. Since machines do not tire, can reliably provide the same output for the same given set of inputs and can readily be reproduced, it would be extremely desirable to develop one that could learn how to classify as well or better than the best human classifiers.

The literature is filled with examples where machines receive data and attempt to classify it in some way. Typically, this data can be represented in the form of a multidimensional vector defined within some hyperspace, wherein each dimension of the vector can be viewed as a feature of the data. Therefore by using machines, one can view many problems as processing an unknown data vector in some way that produces an output, which correctly associates it with a known class. Exemplar based machine learning techniques tackle these problems by learning to distinguish among classes through representative training examples. These techniques can be supervised or unsupervised, classifications can be generalized or specific instances can be retained for comparison purposes, and they can be trained incrementally or in a batch process. Several popular algorithms employing these techniques in various ways have been developed and published in the literature. In general, they result in an algorithm that attempts to classify an unknown data vector after learning from training examples.

Human brains continually classify the detections made by their sensors. Seeing and recognizing someone's face, listening and understanding a spoken word, smelling a lemon, feeling the presence of a liquid and tasting an apple are simple examples of how humans classify the detections made by their sensors. In essence, a person receives data from one or more than one sensor and then classifies the object sensed based on these detections. Of course, one of these classifications is "don't know".

The accuracy under which classifications are made largely depends on the level of experience that the person has that is making the classification. The more experience a person has sensing various objects, the more likely they are to accurately classify an unknown object into one of their categories. Their known categories are generally formed based on what they have initially learned from a teacher (supervised learning) or have independently established based on objects they had discovered (unsupervised learning).

The teacher's function is to provide the student with accurate concrete examples of a particular class. The more examples the student is provided, the better understanding the student has for a given class. Hence when presented with an unknown object that belongs to a class that had been previously learned, one expects that the greater the number of training examples that had been used in the learning process, the more likely the student will be able to accurately classify the unknown object. The reason for this is because classification is greatly aided by familiarity, which increases ones ability to identify similarity.

People utilize their natural and artificial sensors and tools during the classification process. Given an unknown object, the information output from the sensing and measuring sources is processed and a classification is made. This complex process from raw data to classification after which some action may be based can generally be understood to be pattern recognition. Human beings do this all the time; depending on the unknown to be classified, some are better at it than others.

Since machines do not tire, can reliably provide the same output for the same given set of inputs and can readily be reproduced, developing one that could learn how to recognize patterns would be extremely useful. As mentioned, there are several examples within the open literature where machines receive data and attempt to classify it in some way. Typically, this data can be represented in the form of a multidimensional vector defined within some hyperspace (Each dimension of the vector can be viewed as a feature of the data.) Therefore the pattern recognition problem can be viewed as processing this data vector in some way that produces an output, which places it into some class. In general, the approach taken for the design of the classification processor depends on the data one has available. Several approaches are usually attempted with the available data and the one that produces the best results is typically accepted.

Exemplar based machine learning techniques tackle these pattern recognition problems by learning from representative training data. These techniques can be supervised or unsupervised, classes can be generalized or specific instances can be retained for comparison purposes, and they can be trained incrementally or in a batch process. Several popular algorithms employing these techniques in various ways have been developed and published in the literature.

In supervised learning each example in the training set is associated with a known class. In unsupervised learning the training examples are not divided into classes and one attempts to form clusters or find "natural groupings" among them. The Hierarchical Clustering and Self Organizing Map algorithms have been developed in an attempt to find natural groupings among the totality of training examples and ascertain classes based on those natural groupings. It should be noted that clustering the data into natural groupings provides an opportunity for extracting useful information regarding the structure of a given class within its feature hyperspace.

Specific instance algorithms would utilize training examples without any generalization; these types of algorithms are also referred to as lazy learners. The k-Nearest Neighbor would be considered specific instance because unknown data is compared directly with individual training examples. The classes of the k "most similar" training examples to the unknown data are tallied and the classification that represents the majority of those examples selected is assigned to the unknown data. Instance Based Learning also compares unknown data to individual training examples. They function similarly to the nearest neighbor algorithm, however the training examples retained for comparison purposes vary with the instance based algorithm that is chosen. Specific instance type algorithms can become computationally expensive if one needs to compare unknown data with every training example saved. These algorithms may also have very large storage requirements as well.

Generalization algorithms combine training examples and typically compare unknown data to generalized representations of the training data; these types of algorithms are also referred to as eager learners. Hyperrectangle algorithms group training examples as rectangular shapes within the feature hyperspace with sides that are parallel to the features of the data. Unknown data classifications are made based on their proximity to these hyperrectangles. Feature partitioning algorithms attempt to partition each feature range as a series of line segments that are identified with classes based on the training examples. Preliminary classifications are made based on each of the unknown's features proximity to these line segments. As a result, for a given unknown each of its features is independently used to associate the unknown with a class. Each of these independent class associations is assigned a weight. The unknown data is then declared as the class that received the most weight. The neural network algorithms reviewed generally form hyper planes or more complex decision surfaces within the feature space, or as can be the case with support vector machines within some transformed version of the feature space. The data is generalized because whether or not an unknown vector is considered to belong to a particular class depends on which side of the decision surface it lays. The binary decision tree algorithms generalize unknown data as belonging to one branch of classes or another and work their way along various branches until they progress toward an ultimate class leaf. The hierarchical clustering and self-organizing maps formed "natural clusters" from training examples. As the natural clusters were being formed they were compared to the known classes of the training examples.

Incremental vs. Batch Learning

Incremental learning algorithms continually allow the class decision space to be modified every time a new training sample is presented. These recursive techniques are typically sensitive to the order in which the training examples are presented.

Batch learning algorithms utilize all of the training examples in their totality. These algorithms may attempt to utilize every training example as a specific instance, such as in the case of k-Nearest Neighbor. They can also generalize their training examples and solve for their parameters either iteratively or all at once. By utilizing all of the training data at once, batch learning is more likely to find optimal parameters for a given algorithm based on the training data available than incremental learning algorithms. Since batch learning algorithms utilize all of the training data at once they can be more computationally intensive than incremental learning algorithms. Whenever new training data is available, batch learning algorithms often need to reprocess the entire training set in order to obtain their parameters. Incremental learning algorithms simply update their parameters based on the new training data available. The exemplar-based machine learning method developed in this manuscript utilized batch learning to obtain the algorithm parameters.

Principal component analysis (PCA) has often been used successfully in many, many applications as a classification preprocessing feature reduction technique. This has been done on a wide range of data sets from hyperspectral images, to vegetable oil data. A nonlinear kernel based technique, KPCA, has also been developed to further utilize the feature reduction capabilities of PCA. These kernel based techniques have been used successfully for feature reduction of gene expression data. This nonlinear kernel approach is sometimes called "kernel trick" in the literature. These typical applications of PCA utilize all of the training instances as one giant cluster. Researchers have also applied PCA after breaking the training data into a series of clusters. However, the incomplete information that could be extracted when the cluster's covariance matrix is singular is typically not utilized.

The University of California at Irvine data repository was specifically established so that researchers could compare their machine learning techniques with those of other methods on common data sets. The methodology developed in this study was performed on twenty one of those data sets. However, none of the highest performing classification approaches uncovered from other researchers for the data sets assessed utilized any form of PCA to develop their technique. The reason for this may be that common applications of PCA oversimplify the class generalizations for these more complex data sets. Typically data within a given class is the result of a complicated interaction of its features therefore its mean vector and covariance matrix can be poor representations of the entire class. However, if one applies clustering and exclusion techniques within a given class, this work will show that natural groupings can be identified and adequately generalized using principal components even when a cluster's covariance matrix is singular. Therefore, instead of using the typical implementations of PCA as a feature reduction technique, which often requires a nonsingular covariance matrix, the novelty of the technique developed in this manuscript can be viewed as combining clustering, a logical exclusion process and PCA capable of handling singular covariance matrices as a subclass local feature reduction technique.

The ability to classify unknown data after learning from a training set can be extremely useful for a wide range of disciplines. The purpose of this study is to explore and develop a classification technique that is capable of segmenting arbitrary complex multidimensional classes in a way that reveals a final set of clusters which can be adequately generalized with their mean vector, relevant subspace and null space so that the tools of PCA can be harnessed (when the covariance matrix is singular) and an exemplar based machine learning algorithm can be developed. The rationale for this approach lies in the understanding that one can adequately represent a hyper ellipsoidal shaped cloud with its mean vector and covariance matrix. Given enough hyper ellipsoidal shaped clouds of various sizes and orientations one can generalize virtually any arbitrary complex shape within a multidimensional space. Therefore, the more accurately an arbitrary complex class shape can be represented, the better result one anticipates from a similarity assessment with that shape and the more accurately one expects to be able to predict the class of unknown data.

Exemplar based learning methods implicitly assume that data belonging to the same class can potentially be clustered together in some complex arbitrary shape or shapes within the hyperspace of the data features. Therefore, it is based on this reasoning that attempts are made to identify the similarity between unknown data and the specific instance or generalized concepts learned from the training examples. Therefore, if one can adequately approximate how the multidimensional data is clustered and distributed within its feature hyperspace, it seems reasonable to expect that this knowledge could then be applied to develop improved generalized concepts for estimating classes.

Instinctively one expects each class's arbitrary complex multidimensional shape to be revealed through the distribution of an appropriate set of training instances within the pattern recognition problem's hyperspace. This work generalizes this complex shape by breaking each class down into clusters that are easy to describe mathematically. Each cluster is described by its first and second order statistics. A mental image would be that each cluster is generalized as a mean point surrounded by a hyper ellipsoidal shape cloud of size and orientation representative of the training instances from which it is composed. Unknown data vectors are compared to these clusters by calculating normalized Euclidean distances to them. The smaller the Euclidean distance, the greater the association made with the cluster. The class of the cluster with the greatest association becomes the estimated classification for the unknown. This approach has obtained very positive results when tested on two-dimensional synthetically generated data and real data taken from the University of California at Irvine data repository.

BRIEF SUMMARY OF THE INVENTION

It is an object of the present invention to provide a system and method for classifying spatial, temporal, and/or spectral events such as gunfire.

An exemplary embodiment of the present invention utilizes clustering, logical exclusion and PCA (equipped to handle singular covariance matrices) within a training process to develop a classification technique. PCA is harnessed in a way that highlights the most relevant subspace and is effective at generalizing classes. A straightforward application of PCA would be to simply apply it to each class; however, this would typically be an oversimplified approach to generalizing classes. The reason for this is that data for a given class is generally the result of a complicated interaction of its features, which causes its mean vector and covariance matrix to be poor representations of the class. However, an exemplary embodiment of the present invention applies clustering techniques combined with logical exclusion, and identifies groupings within the classes that can be adequately generalized using the most relevant principal components (regardless of whether or not the covariance matrix is singular) and results in a useful classification algorithm.

In general, an exemplary embodiment of the present invention creates pattern classifiers based on training examples involves assuming some form for the classifier then estimating the unknown parameters for that model with those training examples.

An exemplar-based machine learning method in accordance with the present invention utilizes both supervised and unsupervised learning. The training examples may be associated with classes and that information was utilized during algorithm development (supervised learning.) Within each class natural groupings may be identified to cluster the training examples (unsupervised learning). It should be noted that the overall method is not limited to the exemplary clustering processes described herein. Other supervised or unsupervised learning methods could also have been applied to form the clusters that represented each class. The best approach would be the one that contributes to accomplishing the overall classification task best.

An exemplary embodiment of the present invention generalizes each class of a data set as a group of one or more clusters. Each of the clusters formed for a particular class may be generalized with its mean value. Euclidean distances measured from each cluster may be performed with respect to the cluster's mean and may be normalized according to the cluster's second order statistics. Therefore, conceptually each cluster may be generalized as a mean point surrounded by a hyper ellipsoidal shape of size and orientation representative of the training instances from which it was composed. The smaller the normalized Euclidean distance an unknown data vector may have with a cluster, the higher the association that may be made with that cluster.

The present invention may be used to assist in classifying data corresponding to any condition or event that may be measured and that has measurable metrics. Non-limiting examples include; cell classification, e.g., benign vs. cancerous; object or target identification; poor, good or excellent condition of material, etc. After a set of training conditions or events are presented (for example, here are 100 samples of benign cells and 100 samples of cancerous cells), they are placed into groups of clusters and each cluster has features extracted (for example, the average size of the cell for each cluster can be viewed as an extracted feature), which are then used to classify unknown events. In addition, the present invention logically excludes unnecessary clusters, which decreases the effort for processing classification of the unknown events and can improve classification accuracy. Further, the present invention is operable to extract features from an estimated covariance matrix that spans less than the entire space of the cluster of the training data.

In an exemplary working embodiment of the present invention, a sensor senses gunfire. Characteristics of each gunfire, or gunfire event, are stored as data. Non-limiting examples of gunfire characteristics include brightness of muzzle flash, duration of muzzle flash, area of muzzle flash, wavelength decomposition of muzzle flash, etc. Different weapons provide different characteristics. These differing characteristics are used by the present invention to arrange the gunfire event data into groups or clusters, wherein each cluster is based on a relative closeness of various combination of the characteristics. Newly detected events may be stored as data and compared with the arranged clusters for classification as a gunfire event. The sensor may additionally sense non-gunfire events. Events such as a car backfire, a camera flash or lightning strike provide different characteristics. Data corresponding to these non-gunfire events may additionally be used by the present invention to arrange the non-gunfire event data into groups or clusters, and thus assist an embodiment of the present invention to classify a newly detected event as either a gunfire event or a non-gunfire event and associate a confidence level with that classification.

In one aspect of the invention, a device comprises a sensor, a processor and a classifier. The sensor is operable to sense target events. The processor is in communication with the sensor and is operable to organize training event data into a plurality of clusters of candidate target event data, based on event similarities to those of the desired targets (such as gunfire). The processor is further operable to determine relevant features of each cluster, to logically exclude a portion of the plurality of clusters and to assign unknown data events in the closest cluster. The classifier is additionally in communication with the processor and is operable to provide a user with classification information.

In one embodiment, the processor is further operable to utilize an estimated covariance matrix that spans less than the entire space of the cluster of event data.

In one embodiment, the processor is operable to determine relevant features of each cluster by identifying dominant eigenvectors. In this embodiment, the processor is operable to identify dominant eigenvectors by determining whether eigenvalues are larger than expected noise in a direction.

In one embodiment the target event similarities with which the processor is operable to organize target training event data into a plurality of clusters of target event data, based on target event similarities include Euclidean distance between target events.

In one aspect of the invention, a device comprises a sensor, a processor and a classifier. The sensor is operable to sense target events. The processor is in communication with the sensor and is operable to organize target training event data into clusters of target event data. The clusters of target event data yield estimated covariance matrices that span less than the entire space of the cluster of target event data, based on target event similarities, to determine relevant features of each cluster and to place unknown target data events in the closest cluster. The classifier is additionally in communication with the processor and is operable to provide a user with classification information.

Additional objects, advantages and novel features of the invention are set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated in and form a part of the specification, illustrate an exemplary embodiment of the present invention and, together with the description, serve to explain the principles of the invention. In the drawings.

DETAILED DESCRIPTION OF THE INVENTION

Figure 1A:
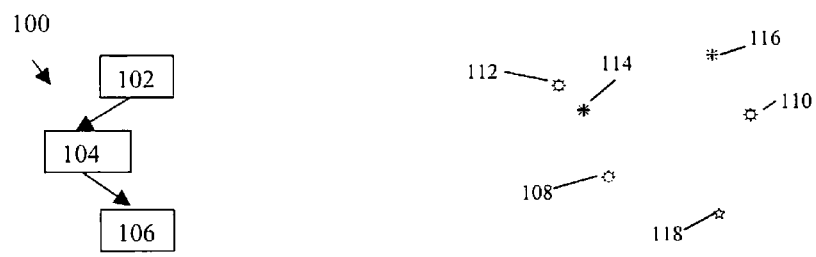
FIG. 1A illustrates an exemplary system in accordance with the present invention training on event data.

As discussed above, the present invention may be used to assist in classification data corresponding to any condition or event that may be measures and that has measurable metrics. Non-limiting examples include; cell classification, e.g., benign vs. cancerous; object or target identification; condition of material, etc. However, an exemplary embodiment of the present invention will now be described.

An exemplary working embodiment of the present invention will now be described with reference to FIG. 1A and FIG. 1B. System 100 includes a sensor 102, a processor 104 in communication with sensor 102 and a classifier 106 in communication with processor 104. Sensor 102 senses events 108, 110, 112, 114, 116 and 118. Each of events 108, 110, 112, 114, 116 and 118 are training events, in that the data corresponding thereto is used to train system 100 for future event classification. In this example, events 108, 110 and 112 correspond to gunfire events from a rifle, events 114 and 116 correspond to gunfire events form a sidearm, and event 118 corresponds to a car back-firing. Characteristics of each event 108, 110, 112, 114, 116 and 118 are stored as data in processor 104. Non-limiting examples of characteristics include flash brightness, flash duration, flash size, and flash wavelength decomposition.

Because events 108, 110 and 112 are from a rifle, if their respective characteristics were to be graphically plotted (for example a graph of flash brightness vs. flash duration, flash size flash duration, or even wavelength decomposition) the events would be located within a close proximity to each other. Similarly, because events 114 and 116 are from a sidearm, if their respective characteristics were to be graphically plotted (for example a graph of flash brightness vs. flash duration, flash size flash duration, or even wavelength decomposition) the events would be located within a close proximity to each other. Different weapons however, provide different characteristics. As such if characteristics of 108, 110, 112, 114, 116 and 118 were to be graphically plotted (for example a graph of flash brightness vs. flash duration, flash size flash duration, or even wavelength decomposition) the cluster of events 108, 110 and 112 may be easily distinguished from the cluster of events 114 and 116, which would be just as easily distinguished from event 118. Processor 104 is operable to group clusters of data in this fashion, which is described in greater detail below.

Once the training events have been grouped into clusters, newly detected events may be stored as data and compared with the arranged clusters for classification as a target event. As illustrated in FIG. 1B, events 122, 124 and 128 are from rifles, event 126 is from a sidearm and event 130 is from a car. In this example, events 122, 124, 126, 128 and 130 are sensed in city 120 by sensor 102.

In this example, processor 104 will graphically plot events 122, 124 and 128 (for example a graph of flash brightness vs. flash duration, flash size flash duration, or even wavelength decomposition). Because events 122, 124 and 128 are all from rifles, the events will be located within a close proximity to each other. Further, each event will be within a close proximity to the cluster of test events 108, 110 and 112. Accordingly classifier 106 will classify events 122, 124 and 128 as rifle gunfire events. System 100 may then indicate to warfighter 132 that events 122, 124 and 128 are rifle gunfire events.

Similarly, in this example, processor 104 will graphically plot event 126. Because event 126 is from a sidearm, it will be within a close proximity to the cluster of test events 114 and 116. Accordingly classifier 106 will classify event 126 as sidearm gunfire event. System 100 may then indicate to warfighter 132 that event 126 is a sidearm gunfire event.

Further, in this example, processor 104 will graphically plot event 130. Because event 130 is from a car backfire, it will be within a close proximity to the test event 118. Accordingly classifier 106 will classify event 130 as non-gunfire event. System 100 may then indicate to warfighter 132 that event 130 is a non-gunfire event.

Accordingly, in a hectic urban warfare setting, it would be very difficult (if not impossible) for warfighter 132 to quickly and accurately recognize many flashes in a cityscape. A system in accordance with the present invention may aid warfighter 132 in quickly determining which events are gunfire (which raise concern) and which events are not gunfire (which may not raise concern). Further, because the specific weapons may be classified, a system in accordance with the present invention may aid warfighter 132 in quickly determining which gunfire events are friendly and which gunfire events are non-friendly. More specifically, classifier 106 may provide warfighter 132 with classification information to distinguish between sensed events 122, 124, 126, 128 and 130. Non-limiting examples of classification information includes visual and audio representations. One non-limiting example of a visual representation includes a video screen having an image of city 120 with representations of events 122, 124, 126, 128 and 130 therein, wherein the events are distinguished from one another according to classification by cluster via shape, color, size or even a label (such as: friendly gunfire, enemy gunfire, non-gunfire, etc.). One non-limiting example of an audio representation includes a speaker system that provides specific sounds corresponding to events 122, 124, 126, 128 and 130, wherein the events are distinguished from one another according to classification by cluster via sound tone or volume.

Figure 1B:
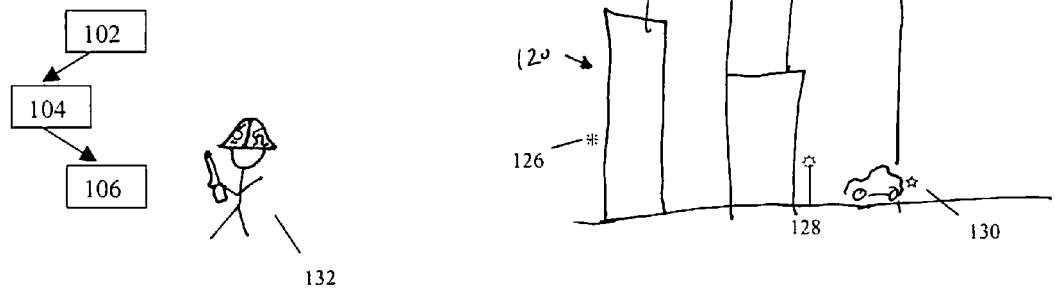
FIG. 1B illustrates the system of FIG. 1A detecting event data.

In FIGS. 1A and 1B, system 100 is illustrated as three separate devices 102, 104 and 106. However, system 100 may be a single device capable of providing the functions of sensor 102, processor 104 and classifier 106. Further system 100 may comprise any number of devices that are operable to provide the functions of sensor 102, processor 104 and classifier 106. Still further a computer readable media may have computer readable instructions stored thereon, wherein the computer readable instructions are capable of instruction a computer to control a system to provide the functions of system 100.

Exemplary methods of training of a system in accordance with the present invention and exemplary methods of classifying new event data will now be described.

Training data may be initially transformed through a normalization process. Each class of the training data may then be grouped into a series of clusters. It is possible for a single training data point to belong to more than one cluster. Each cluster may be generalized by its mean vector. The relevant subspace of each cluster may be extracted and the remaining space may be defined as its corresponding null or noise space. Euclidean distances of an unknown data vector with respect to each cluster may be normalized according to the expected spreads in the relevant and noise spaces. The unknown data vector may be considered to belong to the same class as the nearest cluster based on normalized distance. A leave one out cross validation scheme may be used to estimate the accuracy of the classifier. Unnecessary and excess clusters may then be eliminated to improve accuracy and simplify the algorithm.

Normalize Data

To take into account that some data vectors may consist of disparate, continuous, discrete or binary features the data may be initially transformed through a normalization process. This step prevents features from dominating similarity distances purely based on scaling magnitudes. For example, measurements in millimeters yield much larger numbers than their equivalent in miles. It also allows one to more readily combine various types of data into one overall similarity distance. Normalization may consist of dividing a feature by its largest possible value to avoid having the absolute measurement from skewing the similarity distance clustering process. In addition, it may allow one to form similarity distance measures using disparate features such as weight and distance. For example, in the University of California, Irvine Glass database, the refractive index feature was scaled so that it attained a magnitude of the same order as the weight percent in corresponding oxide features. This approach can be contrasted with other approaches such as Classic Feature Partitioning, which consider each feature separately and divide each one dimensional feature space into segments. Transformation of the feature space is not as important with this approach since no attempt is being made to combine disparate features.

Form Data Clusters within Each Class

The clustering method utilized to form clusters of data within each class can be fairly arbitrary. However, it should be kept in mind that the purpose of this step is to form clusters of data within each class that as a whole are capable of adequately generalizing the data within the class. Therefore, depending on the data set being learned, some methods will accomplish this better than others. Two exemplary methods will now be discussed. The first method, Euclidean Distance with Contiguous Breaks Supervised Clustering (EDCBSC) can be computationally intensive and typically generates a large number of clusters for each class. Due to its computational demands it was not utilized on all of the twenty one real world data sets. The second method k-Means Clustering was used in a repetitive way, and was much less demanding computationally than the first and as a result allowed the implementation of the methodology on more databases. For both methods, each class was partitioned into groups of training instances based on Euclidean distance.

Method 1: EDCBSC

In this method each multidimensional training instance has its Euclidean distance measured with respect to every other point in the entire training set. For each given training instance its corresponding distances are sorted from closest to furthest. If the closest instances are from the same class as the given training instance they are all clustered together. If the closest instance to a given training instance belongs to another class, the given training instance will be stored as a single point cluster. Once a non-class instance breaks the cluster, a new cluster is formed with the previously formed cluster and the next set of contiguous instances in that class. This process is repeated until all of the instances within the class are contained within one final cluster. Every training instance has a turn at being the reference instance for this process and as a result, several repeat clusters may be formed. Out of all the clusters formed only the unique clusters are retained and duplicate clusters are discarded.

Figure 2:
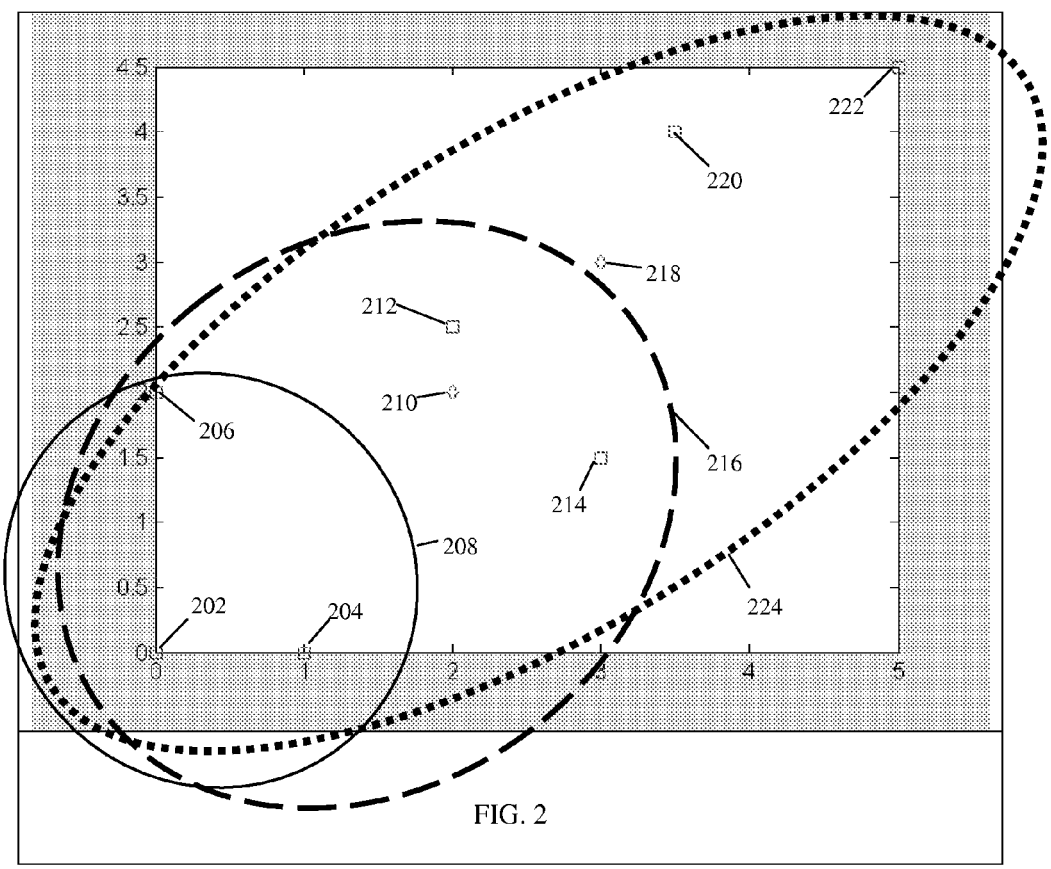
FIG. 2 illustrates an example of the EDCBSC method.

As an example, this method is illustrated in FIG. 2, which shows two classes—seven points of the square class and two points of the diamond class. Square instance 202 located at point (0, 0) is the reference instance. Instance 204 and instance 206, the two closest instances to reference instance 202 are also of the square classification and as a result, these three instances would comprise first cluster 208. The next closest instance, instance 210, is a diamond followed by two square instances, instance 212 and instance 214; therefore these first five square instances would comprise second cluster 216. The next closest instance, instance 218, is a diamond followed by the two final square instances, instance 220 and instance 222, therefore all seven of the square instances would be the third and final cluster 224 for the square class using instance 202 as the reference. This process would be repeated for every instance shown and all unique clusters generated would be retained.

Method 2: Repetitive k-Means Clustering

An exemplary repetitive k-Means clustering process includes the k-Means Clustering (Douda, et al. (2001)) process N times with k equaling values from one to N. This process was used one class at a time exclusively on the instances for each class. In an exemplary embodiment, N was typically set to either the number of training instances within the class or thirty whichever was smaller. The value of thirty was chosen simply because it seemed to produce reasonable results during real world data testing without burdening the processor greatly. The size of this number needs to be large enough so that the data within the class can be adequately approximated. The more complex the hyper shape of the data within its class, the larger this number would need to be. For each value of k, the k-Means clustering process used was the default process that comes with Matlab®. For each class of the data, k randomly selected training instances are used to initialize the k-Means algorithm. These initial mean values will be designated $\mu_i$ where $1 \leq i \leq k$. Within each class, all of the training instances will be associated with whichever $\mu_i$ is closest. These training instances will then be used to recompute $\mu_i$. The process is repeated until $\mu_i$ no longer changes. The final k clusters generated may depend on initialization. The means tend to move so as to minimize a squared error criterion function, however no such function was used in an attempt to obtain an absolute minimum squared error. Since only a functional understanding regarding the effectiveness of the proposed methodology is desired this dependence on initialization will at worst prevent the best possible implementation of the algorithm from being realized.

Measurement Error Covariance Matrix

Measurement error exists for any measurement since there can only be a finite level of precision associated with any given measurement. Therefore, some error will exist for any given attribute of an instance vector and a measurement error covariance matrix will exist. Mathematically, the measurement error covariance matrix is defined in equation (1) Given the measurement error covariance matrix, one could calculate the expected error variance along any direction within the input data hyperspace.

$$(1)\ S_m = E\{(X_m - X)(X_m - X)^T\}$$

$S_m$ is the measurement error covariance matrix.
X represents any given data instance.
$X_m$ represents the measurement of data instance X.
E denotes expected value.
T denotes transpose.

For the purposes of this discussion it will be assumed that $S_m$ is a known fixed matrix regardless of the data vector X that is being measured. If one were to project the component of $(X_m - X)$ along a unit direction u within the measurement space, one could obtain the measurement error variance $\delta_m$ along that direction as shown in equation (2) Therefore knowing $S_m$, one could calculate the expected measurement error variance along any direction u.

$$(2)\ \delta_m = E\{(u^T(X_m - X))^2\} = E\{u^T(X_m - X)(X_m - X)^T u\} = u^T S_m u$$

$\delta_m$ is the measurement error variance along direction u.
u represents any given unit direction within the measurement space.
$S_m$ is the measurement error covariance matrix.
X represents any given data instance.
$X_m$ represents the measurement of data instance X.
E denotes expected value.
T denotes transpose.

If the measurement error is uncorrelated and equal for each dimension within the hyperspace the measurement error covariance matrix would be proportional to the identity matrix as shown in equation (3). Therefore, the measurement error variance along any direction within the hyperspace would be equal as shown in equation (4).

$$(3)\ S_m = \begin{bmatrix} \sigma_n & 0 & \ldots & 0 \\ 0 & \sigma_n & \ldots & 0 \\ \vdots & \vdots & \ddots & \vdots \\ 0 & 0 & \ldots & \sigma_n \end{bmatrix} = \sigma_n I$$

$$(4)\ \delta_m = u^T S_m u = u^T \sigma_n I u = \sigma_n$$

$S_m$ is the measurement error covariance matrix.
$\sigma_n$ is the measurement error variance for each feature within the measurement space.
I is the identity matrix.
$\delta_m$ is the measurement error variance along direction u.
u represents any given unit direction within the measurement space.
T denotes transpose.

Distinguishing Between Cluster Space and (Null) Noise Space

For each cluster, the covariance matrix is calculated and singular value decomposition is used to obtain the eigenvectors and singular values. For each eigenvector, one could calculate the expected measurement error along that direction. If the singular value for the corresponding eigenvector is larger than its expected measurement error variance then the eigenvector will be obtained as belonging to the relevant cluster space otherwise it will be considered as belonging to the (null) noise space.

The measurement error variance along any direction perpendicular to the cluster's relevant space will define the expected spread in the cluster's null (noise) spread for that direction.

Define $C_i$ as the covariance matrix of cluster i. Singular value decomposition enables one to express this matrix as shown in equation (5).

$$(5)\ C_i = E\{(X_i - \mu_i)(X_i - \mu_i)^T\} = U_i \Sigma_i U_i^T$$

$C_i$ is the covariance matrix of cluster i.
$X_i$ represents a data point in cluster i.
$\mu_i$ represents the mean of cluster i.
$U_i$ is the column matrix of eigenvectors $e_{ij}$ for cluster i, (j denotes a column within the matrix.)
$\Sigma_i$ is the diagonal matrix of singular values $\sigma_{ij}$ for cluster i corresponding to eigenvector $e_{ij}$.
E denotes expected value.
T denotes transpose.

Any eigenvector $e_{ij}$ of cluster i's space will have corresponding eigenvalues $\sigma_{ij}$. These eigenvectors will be defined as relevant when their corresponding eigenvalues $\sigma_{ij}$ exceed the measurement error variance $\delta_m$ along the direction of $e_{ij}$ (The singular values of a covariance matrix are equal to its eigenvalues.)

Once all of the relevant eigenvectors are retained, they will be contained as column vectors within $\tilde{U}_i$. $\tilde{U}_i$ is simply a subset of $U_i$ and spans the relevant space of cluster i. There would likewise exist a corresponding diagonal matrix of singular values $\tilde{\Sigma}_i$. A set of vectors orthonormal to $\tilde{U}_i$ will then be defined that completes the basis set for the input data space. These orthonormal vectors will be defined as the null (noise) space vectors and will be contained as column vectors within $W_i$. For each cluster i, one will then have the input data space divided into its relevant space ($\tilde{U}_i$) and null (noise) space ($W_i$). One could then take any vector within the input data space and project it onto either the relevant space or null (noise) space of cluster i. Therefore, when one subtracts an unknown data vector X with the mean of cluster i, one can project this difference onto the relevant and null (noise) spaces as shown in equation (6). $(X-\mu_i)$ may also be represented in terms of its components within the relevant space and null (noise) space of cluster i as shown in equation (7).

$$(6) \begin{bmatrix} X_{es} \\ X_{ns} \end{bmatrix} \begin{bmatrix} \tilde{U}_i^T \\ W_i^T \end{bmatrix} (X - \mu_i)$$

$$(7) \; (X - \mu_i) = \tilde{U}_i X_{es} + W_i X_{ns}$$

$X_{es}$ is the vector of components for $(X-\mu_i)$ within the relevant space of cluster i.
$X_{ns}$ is the vector of components for $(X-\mu_i)$ within the (null) noise space of cluster i.
$\tilde{U}_i$ is the matrix of relevant column eigenvectors for cluster i.
$W_i$ is the matrix of (null) noise space column vectors for cluster i.
X is the unknown data vector.
$\mu_i$ is the mean of cluster i.

Given a difference vector $(X-\mu_i)$, one could find its component within the null (noise) space $(X-\mu_i)_{ns}$ as shown in equation (8) and then normalize this vector into a unit vector as shown in equation (9).

$$(8) \; (X - \mu_i)_{ns} = W_i X_{ns} = W_i W_i^T (X - \mu_i)$$

$$(9) \; v_{ns} = \frac{(X - \mu_i)_{ns}}{\sqrt{(X - \mu_i)_{ns}^T (X - \mu_i)_{ns}}}$$

$(X-\mu_i)_{ns}$ is the null (noise) space component of $(X-\mu_i)$ for cluster i in data space.
$v_{ns}$ is the unit direction of $(X-\mu_i)_{ns}$.
$W_i$ is the matrix of (null) noise space column vectors for cluster i.
$X_{ns}$ is the vector of components of $(X-\mu_i)$ within the (null) noise space of cluster i.
X is the unknown data vector.
$\mu_i$ is the mean of cluster i.

Using unit vector $v_n$, one could then calculate the expected measurement error variance along that direction $\theta_{ns}$ with equation (2) as shown in equation (10). The square root of the expected measurement error variance $\theta_{ns}$ would then be used to normalize the component of the difference vector that lies within the (null) noise space $(X-\mu_i)_{ns}$. When $S_m$ has the form shown in equation (3), $\theta_{ns}$ is constant regardless of direction.

$$(10) \; \theta_{ns} = v_{ns}^T S_m v_{ns}$$

$\theta_{ns}$ is the expected measurement error variance along direction $v_{ns}$.
$v_{ns}$ is the unit direction of $(X-\mu_i)_{ns}$.
$S_m$ is the measurement error covariance matrix.

The expected null (noise) space spread $\theta_{ns}$ and relevant eigenspace singular value matrix $\tilde{\Sigma}_i$ can now be used to define the normalized distance of an unknown vector X to a cluster mean $\mu_i$.

Define Normalized Distance to Cluster Means

As shown in equation (6) and equation (7) the difference between the unknown data vector X and cluster mean $\mu_i$ can be projected onto the relevant space $\tilde{U}_i$ and the null (noise) space $W_1$. The relevant eigenspace singular value matrix $\tilde{\Sigma}_i$ can be used to normalize the component in the relevant space and the expected measurement error variance $O\theta_{ns}$ can be used to normalize the component in the perpendicular space. They are utilized for this purpose by creating the normalization matrix $\Sigma_i^{-1/2}$ shown in equation (11) and equation (12).

$$(11) \; \Sigma_i^{-1/2} = \begin{bmatrix} \tilde{\Sigma}_i^{-1/2} & \vec{0} \\ \vec{0} & \frac{1}{\sqrt{\theta_{ns}}} \end{bmatrix}$$

$$(12) \; \tilde{\Sigma}_i^{-1/2} = \begin{bmatrix} \frac{1}{\sqrt{\sigma_{i1}}} & 0 & \cdots & 0 \\ 0 & \frac{1}{\sqrt{\sigma_{i2}}} & 0 & \vdots \\ \vdots & \vdots & \ddots & 0 \\ 0 & 0 & 0 & \frac{1}{\sqrt{\sigma_{ir}}} \end{bmatrix}$$

$\Sigma_i^{-1/2}$ is the diagonal normalization matrix for cluster i.
$\tilde{\Sigma}_i^{-1/2}$ is a diagonal matrix containing the inverted square root of the relevant space singular values for cluster i.
$\theta_{ns}$ is the expected measurement error variance along (null) noise space direction $v_{ns}$.
$\sigma_{ij}$ is the expected variance along eigenvector j for cluster i.
R is the rank of the relevant space of cluster i.

The vector of eigenvector components for $(X-\mu_i)$ within the relevant space of cluster i is represented as $X_{es}$ as shown in equation (6). The total magnitude of $(X-\mu_i)$ that lies within the (null) noise space of cluster i is equal to the magnitude of $X_{ns}$ also defined in equation (6). Equations (11) and (12) can be used to generate the normalized difference $d_i$ of $(X-\mu_i)$ as shown in equation (13). The reduced dimensionality normalized difference vector $d_i$ consists of the normalized components of $(X-\mu_i)$ in the relevant space and the single normalized component of $(X-\mu_i)$ that extends within the (null) noise space. The magnitude of the normalized distance of $(X-\mu_i)$ is simply calculated as shown in equation (14).

$$(13) \; d_i = \Sigma_i^{-1/2} \begin{pmatrix} X_{es} \\ |(X - \mu_i)_{ns}| \end{pmatrix}$$

$$(14) \; |d_i| = \sqrt{d_i^T d_i}$$

$d_i$ is the reduced dimensionality normalized difference vector of $(X-\mu_i)$.
$\Sigma_i^{-1/2}$ is the diagonal normalization matrix for cluster i.
$X_{es}$ is the vector of components for $(X-\mu_i)$ within the relevant space of cluster i.
$|(X-\mu_i)_{ns}|$ is the magnitude of the null (noise) component of $(X-\mu_i)$ for cluster i.

Leave One Out Cross Validation

A leave one out cross validation scheme may be employed to assess classification accuracy. In order to accomplish this, each training data instance may take a turn at becoming the unknown data instance. The algorithm may be formed using all of the training instances except the unknown data instance. The unknown data instance may then be classified by the algorithm. The class estimated for the unknown data instance may be the same as the class of the cluster for which it has the smallest normalized distance specified in equation (14). The algorithm will be either correct or wrong and the result will be stored. Every training data instance may have a turn at being the unknown and the results may be tallied. The following three calculations may be performed to help assess the accuracy of the algorithm.

1. The overall fraction of correct classification $F_C$:

This is simply the number of data instances that were classified correctly $P_C$ divided by the total number of data instances $P_T$ as shown in equation (15).

$$（15）\quad F_C = \frac{P_C}{P_T}$$

$F_C$ is the overall fraction of training instances classified correctly using leave one out cross validation.
$P_C$ is the number of training instances correctly classified.
$P_T$ is the total number of training instances.

2. Fraction of correct classification given known correct classification $F_{D|H}{}^i$:

Out of all the training instances that belong to classification i, $F_{D|H}{}^i$ is the fraction of those instances that were classified correctly as shown in equation (16). If enough data instances are used $F_{D|H}{}^i$ should approach the probability $P(D_i|H_i)$ which is the probability that class i is declared given that the unknown data instance belongs to class i.

$$（16）\quad F_{D|H}^i = \frac{P_C^i}{P_T^i}$$

$F_{D|H}{}^i$ is the overall fraction of training points classified correctly that belong to class i using leave one out cross validation.
$P_C^i$ is the number of training points correctly classified that belong to class i.
$P_T^i$ is the total number of training points that belong to class i.

3. Fraction of correct classification given estimated classification $F_{D|H}{}^i$:

Out of all the training instances that were classified as belonging to classification i, $F_{D|H}{}^i$ is the fraction of those instances that actually belonged to classification i as shown in equation (17). If enough data instances are used $F_{D|H}{}^i$ should approach the probability $P(H_i|D_i)$ which is the probability that the point belongs to class i given that the algorithm declared it as belonging to class i.

$$（17）\quad F_{H|D}^i = \frac{P_C^i}{P_D^i}$$

$F_{H|D}{}^i$ is the overall fraction of training instances classified correctly that belong to class i given that the algorithm declared the point to belong to class i using leave one out cross validation.
$P_C^i$ is the number of training instances correctly classified that belong to class i.
$P_D^i$ is the total number of training instances that were declared as belonging to class i.

Eliminate Excess Clusters

During the supervised clustering stage some of the clusters generated will be necessary for correct classification while others will not be necessary and others will be a source of inaccuracy. The next stage of the methodology is designed to eliminate the clusters that are a source of inaccuracy and unnecessary. They are unnecessary because their removal will not cause any additional training instance to be misclassified. This is accomplished in four logical stages. First, for each data instance all of the clusters may be ranked according to the instance's normalized distance to them. The top classifying and misclassifying clusters may be retained. Each cluster may be associated with the entire set of training instances for which it is a top classifying cluster and top misclassifying cluster. Second, an assessment will be made as to whether or not the cluster is eligible to be removed "weedable." Third, clusters that cause misclassification may be removed as long as their removal does not cause the misclassification of any instance. Fourth, only the most useful clusters may be retained and clusters that are superfluous may be removed. The leave one out method is not being violated during this portion of the procedure because clusters are only being eliminated based on the aggregate results from the training examples.

Figure 3:
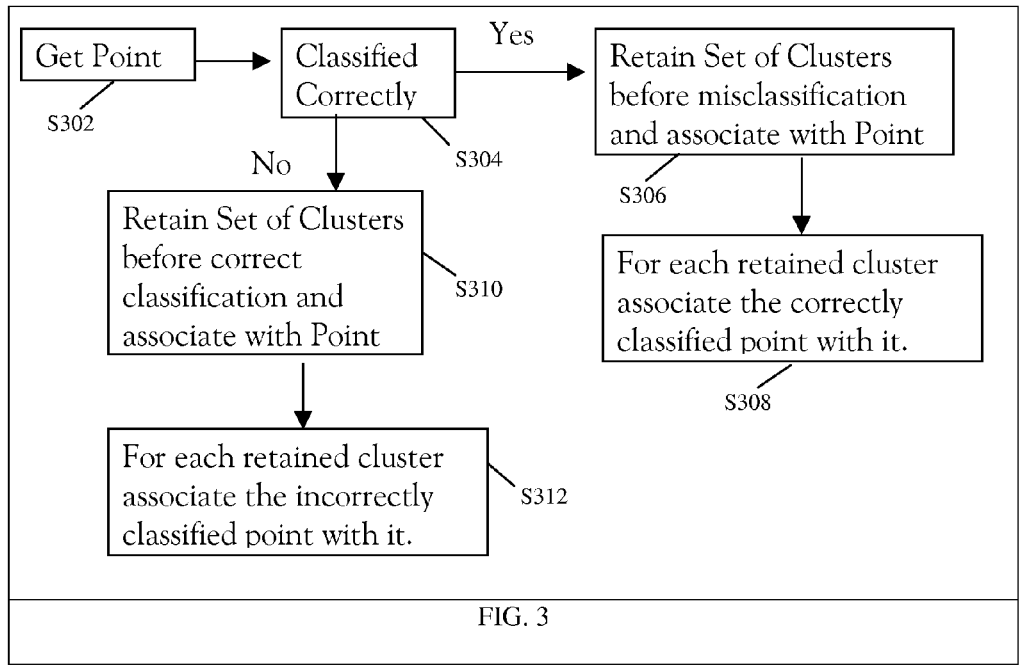
FIG. 3 illustrates a flow chart of an exemplary first step for eliminating excess clusters.

Retain Top Classifying and Misclassifying Clusters. A logical flow diagram for a first step described in eliminating excess clusters is shown in FIG. 3.

For a given unknown data instance vector (S302), the normalized distance to every cluster shown in equation (14) is calculated. These distances are sorted from smallest to largest. The classification of the cluster with the smallest normalized distance would be the classification assigned to the unknown data. If the classification is correct (S304), the next closest clusters that correctly classify it are also retained until the first cluster is reached that misclassifies it (S306). Therefore, for a given training instance that was classified correctly the cluster information retained would be those clusters that are its top classifying clusters (S308) Likewise, if the classification of the unknown data vector is incorrect (S304), the next closest clusters that also misclassify it are retained until a cluster is reached that correctly classifies it (S310). Therefore, for a given training instance that was classified incorrectly the cluster information retained would be those clusters that are its top misclassifying clusters (S312). This information is then retained for subsequent steps. In addition, each cluster will be associated with the entire set of training instances for which it is a top classifying cluster and top misclassifying cluster.

Figure 4:
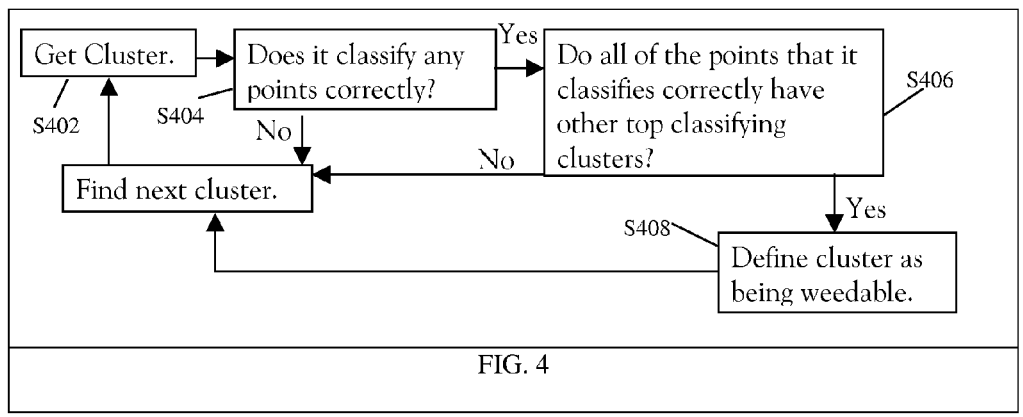
FIG. 4 illustrates a flow chart of an exemplary second step for eliminating excess clusters.

Define Whether or Not Each Cluster is "Weedable". A logical flow diagram for this second step to eliminating excess clusters is shown in FIG. 4.

The purpose of this step is to identify which clusters can safely be removed without causing any additional training instance to be misclassified. For a given cluster (S402), if all the instances that it classifies correctly (S404) have other top classifying clusters (S406), then that cluster would be marked as "weedable" (S408). The reasoning being that if it were removed, no point would be misclassified since every point that it was a top classifying cluster for also had other top classifying clusters.

Figure 5:
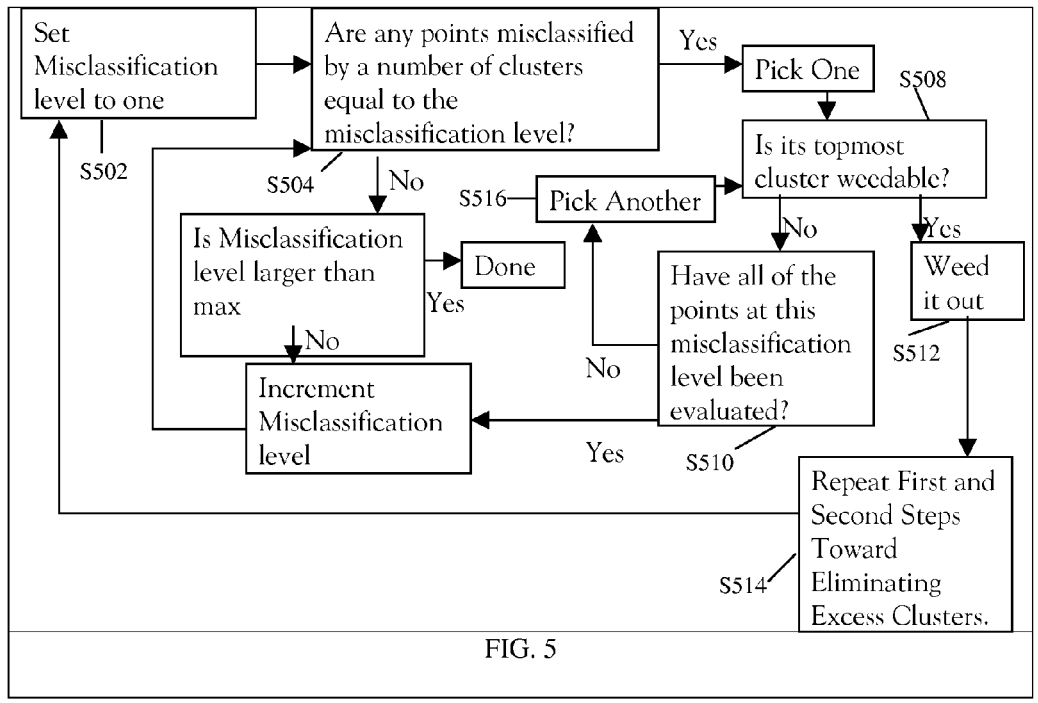
FIG. 5 illustrates a flow chart of an exemplary third step for eliminating excess clusters.

Weed Out All Topmost Unnecessary Misclassification Clusters. A logical flow diagram for this third step to eliminating excess clusters is shown in FIG. 5.

The purpose of this step is to remove clusters that cause misclassifications but if removed would not cause any training instance to be misclassified. All of the points that are misclassified are evaluated. The misclassified instance that has the smallest misclassification level is evaluated first (S502). If an instance only has one top misclassifying cluster it would have a misclassification level of one, two misclassifying clusters would have a misclassification level of two and so on (S504). The topmost misclassifying cluster for that instance (i.e. cluster with the smallest normalized distance) is checked to see whether or not it is "weedable" (S508). If it is "weedable" it is weeded out (S512); otherwise the misclassified instance with the next lowest misclassification level has its topmost misclassification cluster evaluated for "weedability" (S510) and so on (S516). Once a cluster is weeded out, the algorithm returns to steps illustrated in FIG. 3 and FIG. 4 toward eliminating excess clusters and repeats (S514). This continues until all of the topmost unnecessary misclassification clusters are weeded out.

Figure 6:
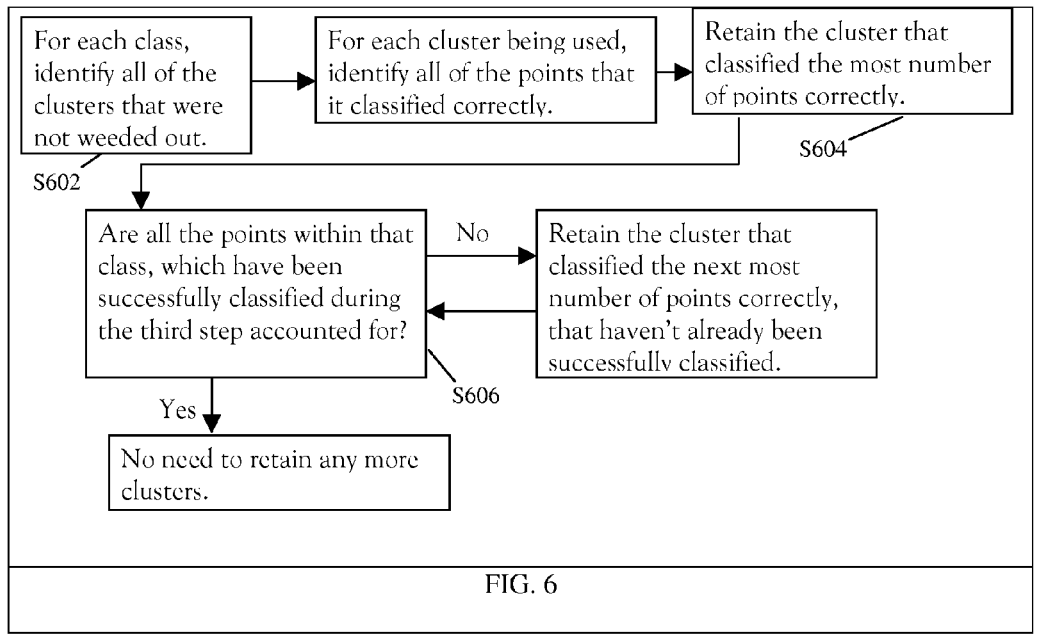
FIG. 6 illustrates a flow chart of an exemplary fourth step for eliminating excess clusters.

Eliminate Excess Correct Classification Clusters. A logical flow diagram of this fourth step to eliminating excess clusters is shown in FIG. 6.

The purpose of this step is to retain only those clusters that are top classifying clusters for the most number of training instances within each class. For each class, out of all the clusters that have not been weeded out (S602), the cluster that is a top classifying cluster for the most number of training instances is retained (S604). If that cluster is a top classifying cluster for every training instance within its class, then no other clusters need to be retained. Otherwise, the top classifying cluster that classifies the most number of training instances that haven't already been successfully classified is retained. This cluster retention is continued until every training instance that had been successfully classified after completion of the steps illustrated in FIG. 4 is still correctly classified (S606). However, now a significantly reduced number of clusters are being used to maintain this accuracy level.

In order to illustrate the main concept of the proposed methodology two dimensional data was generated so one could graphically visualize the outcome of the individual steps. These steps were also performed twice with the two different clustering methods outlined (Euclidean Distance with Contiguous Breaks Supervised Clustering and Repetitive k-Means Clustering) so one could compare the effects. To assist in understanding the clustering, consider that the data corresponds to gun-firing and non-gun-firing data having specific characteristics, such as for example flash brightness and flash duration.

Figure 7:
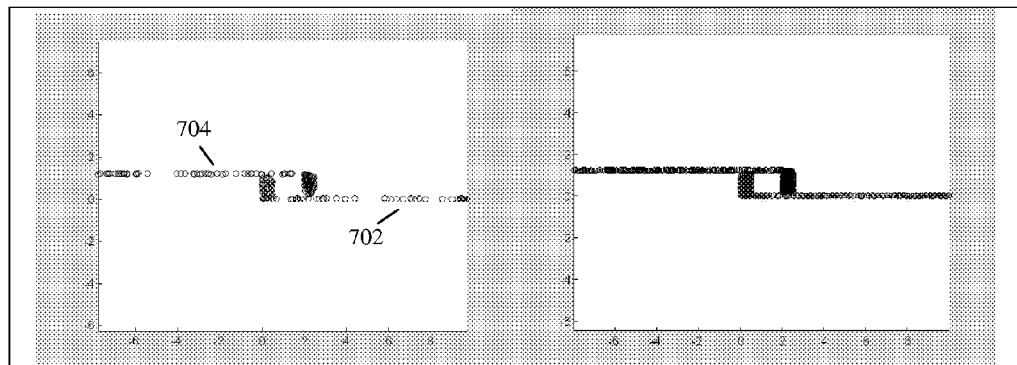
FIG. 7 illustrates two graphs of synthetically generated two-dimensional data, training on the left and testing on the right.

The 2D synthetic data was generated using the uniform probability distribution random number generator within Matlab®. Two classes were generated and each class was composed of two parts. For each class the distribution of the two parts consists essentially of two perpendicular lines in the form of a "golf club" shape. For class one, its first part had the x-axis attribute distributed between zero and ten and the y-axis attribute was equal to +0.025. Its second part had the x-axis attribute equal to +0.25 and the y-axis attribute was distributed between +0.05 and +1.05. For class two, its first part had the x-axis attribute distributed between −8.0 and +2.0 and the y-axis attribute was equal to +1.225. Its second part had the x-axis attribute equal to +2.25 and the y-axis attribute was distributed between +0.2 and +1.2. The uniform probability distribution random number generator using a width equal to 0.5 and 0.05 for x and y respectively was used to simulate independent measurement error for the x and y attributes. The data just described was generated for training (200 points, 100 points per class) and testing (1000 points, 500 points per class) and is displayed in FIG. 7, where the first class 702 is represented with the "golf club handle" to the right and the second class 704 has its "golf club handle" to the left. In FIG. 7, 100 points per class used for training are illustrated on the left, whereas 500 points per class used for testing are illustrated on the right.

Figure 8:
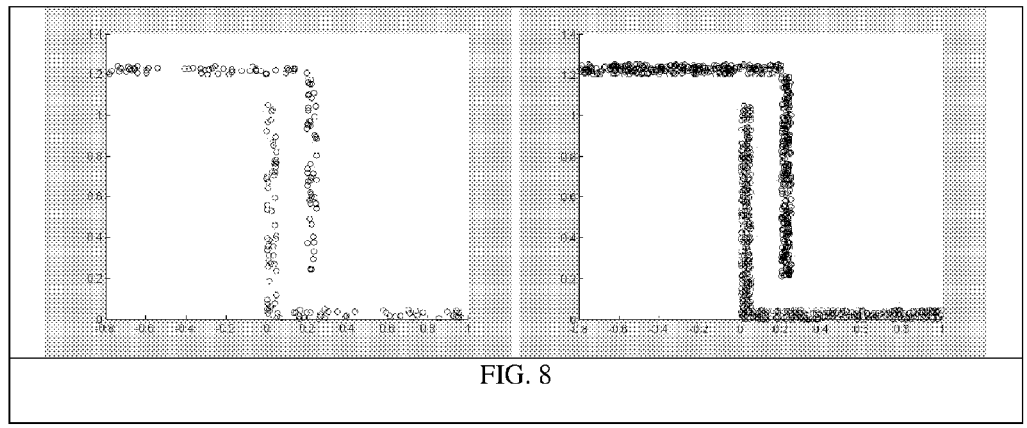
FIG. 8 illustrates the graphs of FIG. 7, wherein the data is normalized.

The first thing to notice about the data is that the range of values for the x attribute is a factor of ten larger than the y attribute. Therefore, if there is no physical reason to have the x attribute dominate the clustering process, which will be determined based on Euclidean distance, the normalization step could simply have all of the x-values of the data normalized by ten. The result of this normalization is displayed in FIG. 8. In FIG. 8, 100 points per class used for training are illustrated on the left, whereas 500 points per class used for testing are illustrated on the right. Note that as a result of this normalization, the measurement error generated was effectively performed with a uniform probability distribution of width 0.05 for both attributes.

The next step of the methodology is to form clusters within each classification that could be used to adequately generalize the data. As mentioned, two different clustering methods will be used for this step. Since two different clustering methods will be used, the two dimensional analysis will progress through two different paths from this point. The first path will begin with the Euclidean Distance with Contiguous Breaks Supervised Clustering (EDCBSC) and the second path will begin with Repetitive k-Means Clustering. By comparing these two paths one can visualize graphically the effects on the learning process caused by these two different clustering methods when applying this methodology to the synthetically generated data. This emphasizes the flexibility that one has in choosing a clustering approach for a given data set. Since the purpose of the clustering is to obtain clusters that can be used to adequately generalize the classification and ultimately accurately classify unknown data, one may want to explore various clustering methods when learning data with this methodology. The reason for this is simply that depending on the domain being learned, some methods may be more accurate than others in finding the most appropriate clusters for generalization.

Path 1: EDCBSC

The Euclidean Distance with Contiguous Breaks Supervised Clustering (EDCBSC) process described earlier was performed on the training data of FIG. 7 and resulted in an initial number of clusters for class one 702 equal to 889 and for class two 704 equal to 897. The large number of clusters indicates that many superfluous clusters were generated using the EDCBSC process.

As mentioned, after the normalization process a constant independent measurement error taken from a uniform probability distribution function comprised of width 0.05 was effectively used to generate the data for both attributes. This error corresponds to a constant independent variance of 0.00020833 for each attribute. Therefore, the measurement error covariance matrix $S_m$ would have the form shown in equation (3) and the measurement error variance along any direction as shown in (4) would have a value equal to 0.00020833.

Figure 9:
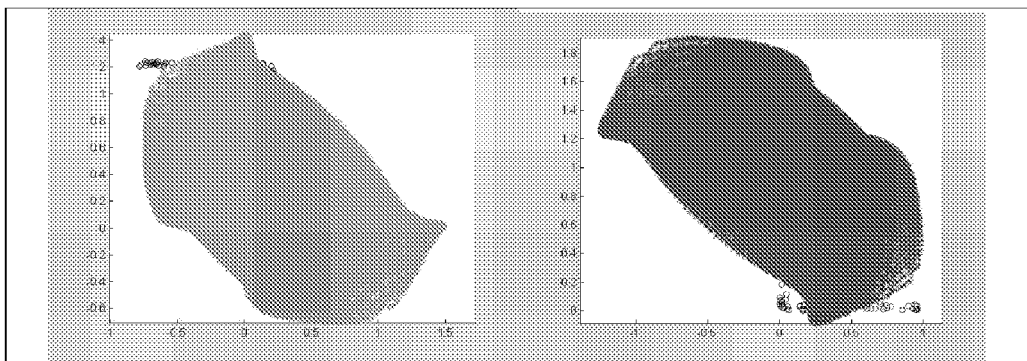
FIG. 9 illustrates overlap of cluster ellipses derived from the synthetically generated two-dimensional data for FIG. 8.

Since the measurement error variance is a constant 0.00020833 regardless of the direction within the attribute data space, one can not only use this variance to identify the relevant space (shown in equation (6)) of each cluster through its singular values but also the expected measurement error spread along the (null) noise space direction (shown in equation (10)). This information is all that is needed to define how one would normalize the distance of any unknown data vector to a cluster's mean as shown in equation (14). All of the unique clusters generated during the EDCBSC process are represented in FIG. 9. In FIG. 9, overlap of all the cluster ellipses are initially formed to represent class one, which is represented by bottom "L shaped" points completely covered by overlapping clusters on left, and class two, which is represented by top points of completely covered by overlapping clusters on right.

The shape of each individual cluster is an ellipse and its size is portrayed using three standard deviations of its spread in each direction. Due to the large number of clusters generated for each classification, the figures illustrate the significant overlap of the generalizing clusters for each classification. In fact, there is so much overlap that a single cluster cannot be distinguished in the plots.

All of these clusters were retained and then processed with the 200 training instances (Train) using the leave one out cross validation technique described earlier. They were also processed on the randomly generated test set of 1000 instances that were not used to generate the clusters. For both data sets (training and testing) each instance was classified based on the classification of the cluster which had the smallest normalized distance. The overall fraction of correct classification $F_C$ as defined by equation (15), fraction of correct classification given known correct classification $F_{D|H}^i$ as defined by equation (16) and fraction of correct classification given estimated classification $F_{D|H}^i$ as defined by equation (17) were calculated. These initial results are shown in Table 3.1 below.

| Class | Binary Classification | $F_{D|H}^i$ Train | $F_{H|D}^i$ Train | $F_{D|H}^i$ (1000) | $F_{H|D}^i$ (1000) |
|---|---|---|---|---|---|
| 1 | Bottom Points | 0.8900 | 0.9175 | 0.9060 | 0.8662 |
| 2 | Top Points | 0.9200 | 0.8932 | 0.8600 | 0.9015 |
|  |  | $F_C = 0.9050$ |  | $F_C = 0.8830$ |  |

Table 3.1 represents the initial accuracy of the 2D synthetic data. The leave one out cross validation assessment used on the training points is labeled "Train". The testing of the additionally generated 1000 data points is labeled (1000). The calculations performed are defined in equations (15), (16) and (17).

Figure 10:
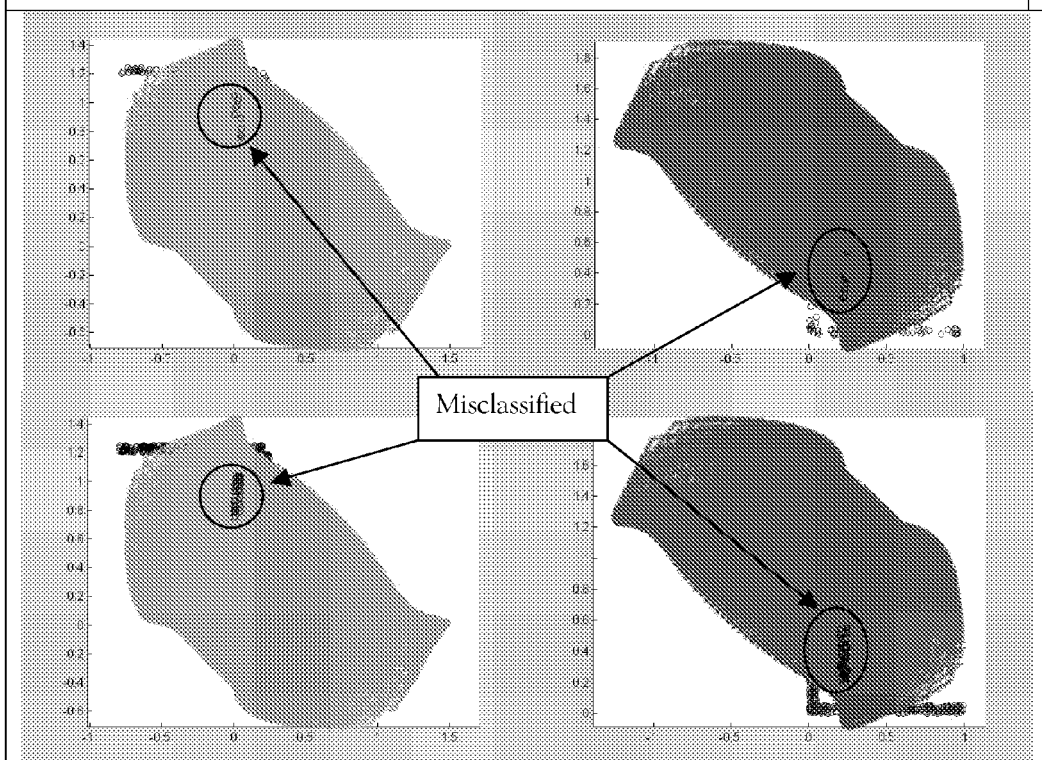
FIG. 10 illustrates misclassified data from the cluster ellipses of FIG. 9.

The clusters for each class displayed in FIG. 9 are redisplayed in FIG. 10 with the locations of their misclassified instances highlighted. FIG. 10 illustrates overlap of all the cluster ellipses initially formed to represent class one (bottom points (FIG. 8) generalized by clusters on left) and class two (top points (FIG. 8) generalized by clusters on right). The class one points that their generalizing clusters did not properly classify (left) and the class two points that their generalizing clusters did not properly classify (right) are shown. The top row represents the leave one out training (200 points) results and the bottom row the testing (1000 points) results. Note that the training instances that were misclassified effectively predict the locations for the test instances that were misclassified.

With respect to weeding out unnecessary clusters that contributed toward generating misclassifications, the maximum misclassification level shown in FIG. 4 was set to the highest misclassification level. These steps resulted in the following change in the number of clusters used as shown in Table 3.2 below.

| Class | Binary Classification | Initial Clusters | After Third Step of Eliminating Clusters (EEC3) |
|---|---|---|---|
| 1 | Bottom Points | 889 | 571 |
| 2 | Top Points | 897 | 523 |

Table 3.2 illustrates the number of clusters generated for each class after the third step of eliminating excess clusters compared to the initial number of clusters for the 2D synthetically generated data.

The corresponding accuracy levels obtained by the classifier after this weed out process are illustrated in Table 3.3 below.

| Class | Binary Classification | $F_{D|H}^i$ Train | $F_{H|D}^i$ Train | $F_{D|H}^i$ (1000) | $F_{H|D}^i$ (1000) |
|---|---|---|---|---|---|
| 1 | Bottom Points | 1.0 | 1.0 | 0.9840 | 0.9647 |
| 2 | Top Points | 1.0 | 1.0 | 0.9640 | 0.9837 |
|  |  | $F_C = 1.0$ |  | $F_C = 0.9740$ |  |

Table 3.3 illustrates the synthetic 2D data accuracies after the third step of eliminating excess clusters. The leave one out cross validation method is labeled "Train". The testing of the additional 1000 data points is labeled (1000). The calculations performed are defined in equations (15), (16) and (17).

Note that perfect accuracy was estimated for the training instances using the leave one out cross validation technique. Therefore, if the training data was a perfect representation of the total domain of the data, one could expect the algorithm to perfectly classify any unknown instances presented. However, since the training data does not perfectly represent the entire domain, the 1000 test data points were not perfectly classified. Although, the overall accuracy for the 1000 unknown test points did substantially improve from 0.8830 to 0.9740 as a consequence of the third step of the process for eliminating excess clusters.

Figure 11:
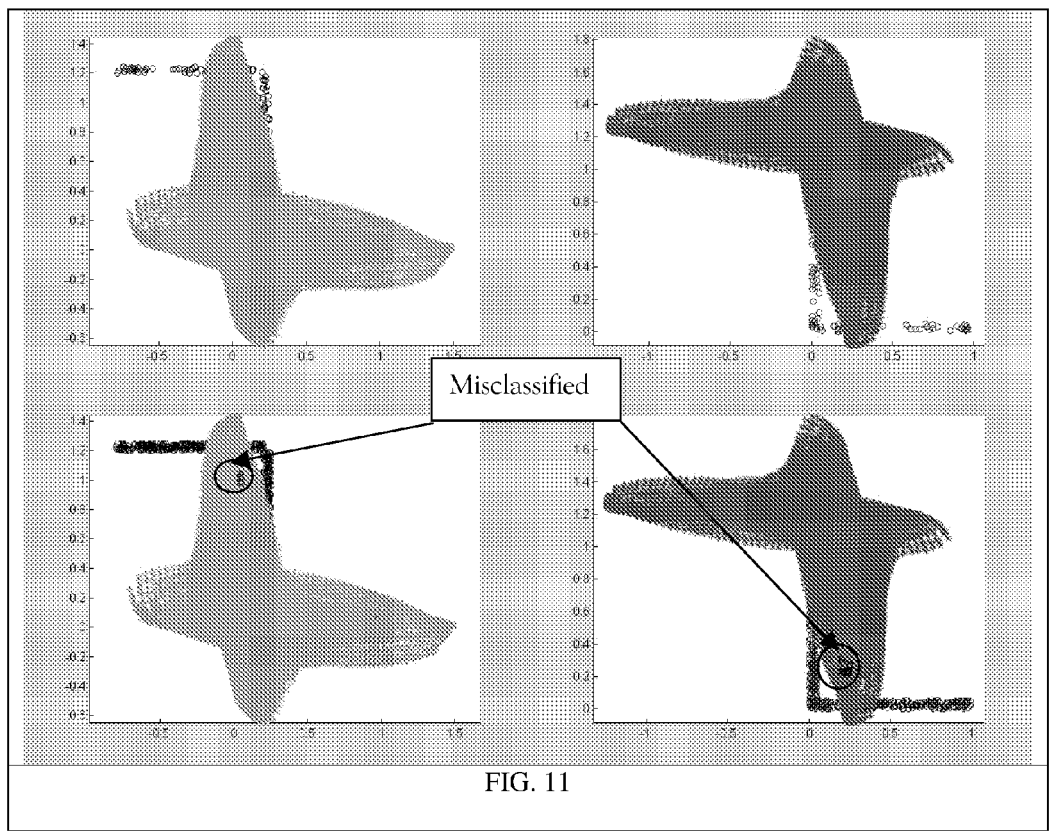
FIG. 11 illustrates overlap of cluster ellipses of FIG. 10 after a weed out process.

The remaining clusters for each class are displayed in FIG. 11 with the locations of the misclassified test instances highlighted. FIG. 11 illustrates overlap of all the cluster ellipses formed after the weed out process of eliminating excess clusters to represent class one (bottom instances (FIG. 8) generalized by clusters on left) and class two (top instances (FIG. 8) generalized by clusters on right). The class one instances that their generalizing clusters did not properly classify (left) and the class two instances that their generalizing clusters did not properly classify (right) are shown. The top row represents the leave one out training (200 instances) results and the bottom row the testing (1000 instances) results. No misclassifications were made during leave one out cross validation on the training instances. Since no training instances were misclassified during leave one out cross validation after the third step of the process of eliminating excess clusters, there were no training instances to highlight for the top plots. Note that after the third step of the process of eliminating excess clusters not only did the overall accuracy increase, qualitatively a more accurate generalization of the classes using the clusters resulted.

With respect to eliminating any excess correct classification clusters, the final number of clusters after the fourth step in the process of eliminating excess clusters is displayed in Table 3.4 below.

| Class | Binary Classification | Initial Clusters | After EEC3 | Final Clusters |
|---|---|---|---|---|
| 1 | Bottom Points | 889 | 571 | 4 |
| 2 | Top Points | 897 | 523 | 4 |

Table 3.4 illustrates the final number of clusters retained after the fourth and final step of the process for eliminating excess clusters for both classes compared to those after the third step in the process for eliminating excess clusters as well as the initial number of clusters generated for the 2D synthetic data.

Note that the number of clusters was reduced extensively to merely four for each class. This step will not change the leave one out accuracy level predictions, but does alter the remaining 1000 point accuracies realized. In fact, the overall accuracy of the testing instances increased after the fourth step of the process of eliminating excess clusters. The accuracy results are displayed in Table 3.5 below.

| Class | Binary Classification | $F_{D\backslash H}{}^i$ Train | $F_{H\backslash D}{}^i$ Train | $F_{D\backslash H}{}^i$ (EEC3) (1000) | $F_{H\backslash D}{}^i$ (EEC3) (1000) | $F_{D\backslash H}{}^i$ (EEC4) (1000) | $F_{H\backslash D}{}^i$ (EEC4) (1000) |
|---|---|---|---|---|---|---|---|
| 1 | Bottom Points | 1.0 | 1.0 | 0.9840 | 0.9647 | 0.9920 | 0.9725 |
| 2 | Top Points | 1.0 | 1.0 | 0.9640 | 0.9837 | 0.9720 | 0.9918 |
|   |   | $F_C = 1.0$ | | $F_C = 0.9740$ | | $F_C = 0.9820$ | |

Table 3.5 illustrates synthetic 2D data accuracies after the fourth and final step of the process of eliminating excess clusters realized on the additional 1000 instances. The leave one out cross validation method is labeled "Train" and the testing of the remaining 1000 data points after the third step of the process of eliminating excess clusters. The calculations performed are defined in equations (15), (16) and (17).

Figure 12:
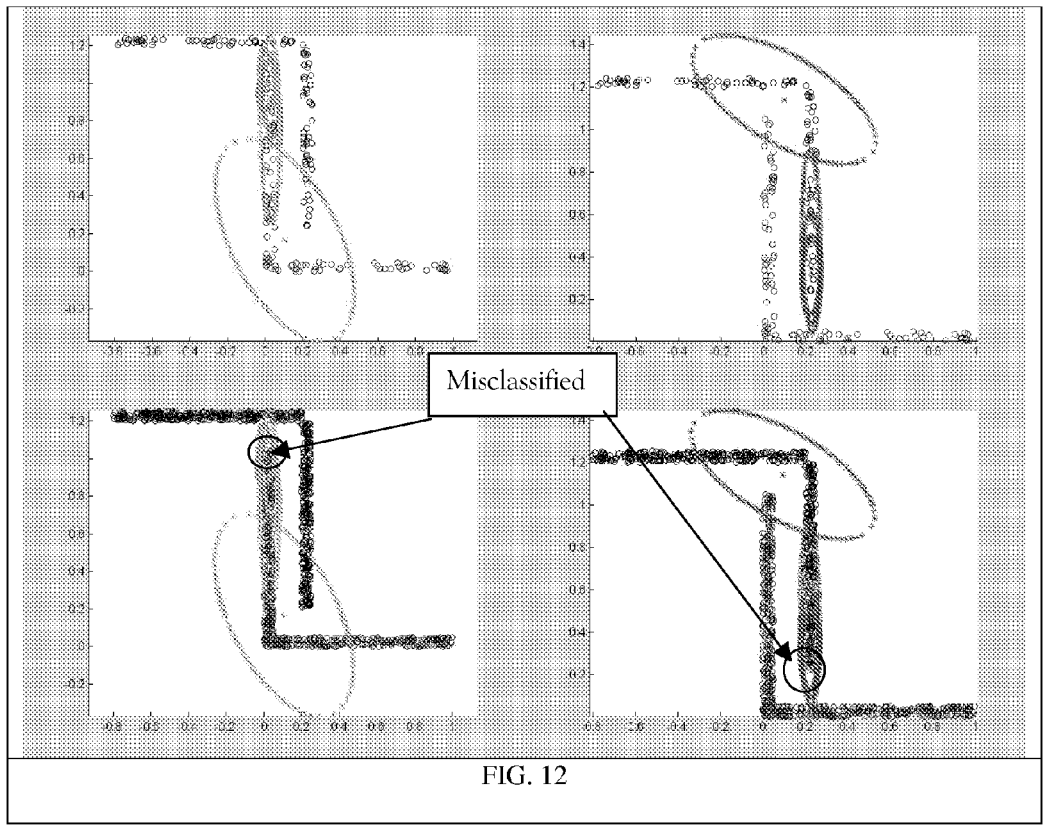
FIG. 12 illustrates overlap of cluster ellipses of FIG. 11 after a final elimination process.

The minimally remaining clusters for each class are displayed in FIG. 12 with the locations of the misclassified test instances highlighted. FIG. 12 illustrates the cluster ellipses formed after the final elimination process in the process of eliminating excess clusters to represent class one (bottom instances (FIG. 8) generalized by clusters on left) and class two (top instances (FIG. 8) generalized by clusters on right). The class one instances that their generalizing clusters did not properly classify (left) and the class two instances that their generalizing clusters did not properly classify (right) are shown. The top row represents the leave one out training (200 instances) results and the bottom row the testing (1000 instances) results. No misclassifications were made during leave one out cross validation on the training instances. As before, no training instances were misclassified during leave one out cross validation therefore there were no training instances to be highlighted for the top plots.

Note that after the fourth step of the process of eliminating excess clusters a visualization of the class generalization using the clusters was obtained and improved accuracy of the test points resulted. However, due to the representation of the domain from the training instances used, large generalization clusters were considered to be adequate at the corners of both classes (i.e. despite the retention of these qualitatively poor generalizing clusters, 100% leave one out cross validation accuracy was achieved.) The poor generalization of the clusters in these sections is the reason why perfect classification is not realized on the test points. These results indicate that the clustering technique chosen can influence the accuracy of the algorithm.

The training process methodology described above was performed on the synthetically generated two dimensional data after using Euclidean Distance with Contiguous Breaks Supervised Clustering (EDCBSC.) As one went through the various steps a visual understanding of how the generalization of the classes was improved and simplified by the algorithm was shown. One anticipates that better clustering techniques may improve the generalization and classification accuracy of the algorithm even further.

Path 2: Repetitive k-Means Clustering

Figure 13:
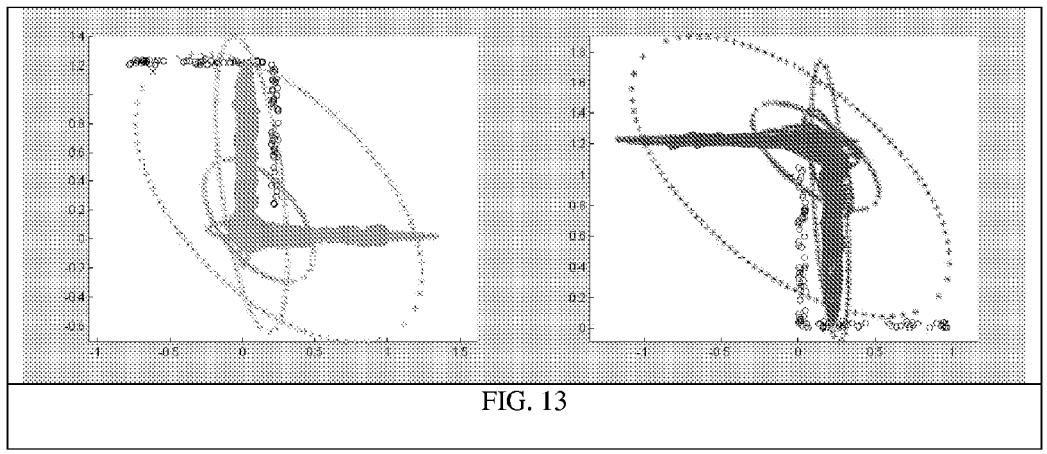
FIG. 13 illustrates overlap of cluster ellipses formed with k-Means clustering.

The 2D synthetic data displayed in FIG. 7 was normalized as shown in FIG. 8 then Repetitive k-Means Clustering was used for the clustering process. K-Means clusters were initially generated for each classification with k assuming values $1 \leq k \leq 20$. This resulted in an initial number of unique clusters for class one equal to 97 and for class two equal to 102. Note that Repetitive k-Means clustering implemented as specified significantly reduced the initial number of clusters for each class compared to EDCBSC discussed above. EDCBSC originally generated 889 clusters for class one and 897 clusters for class two. This reduction in unique clusters considerably reduced the processing load during the training process. All of the unique clusters generated during the Repetitive k-Means clustering process are represented in FIG. 13. As before, the shape of each cluster is an ellipse and its size is portrayed using three standard deviations of its spread in each direction. Note that although the number of unique clusters generated was significantly reduced, this initial generalization visually assumes the general shape of the classifications better than the EDCBSC approach.

This data was processed on the 200 training instances (Train) using the leave one out cross validation technique described earlier. It was also processed on the randomly generated test set of 1000 instances (1000) that were not used to train the algorithm. Both processing resulted in the following overall fraction of correct classification $F_C$ as defined by equation (15), fraction of correct classification given known correct classification $F_{D|H}{}^i$ as defined by equation (16) and fraction of correct classification given estimated classification $F_{D|H}{}^i$ as defined by equation (17). These initial results are shown in Table 3.6 below.

| Class | Binary Classification | $F_{D\backslash H}{}^i$ Train | $F_{H\backslash D}{}^i$ Train | $F_{D\backslash H}{}^i$ (1000) | $F_{H\backslash D}{}^i$ (1000) |
|---|---|---|---|---|---|
| 1 | Bottom Points | 0.9200 | 0.9020 | 0.8940 | 0.8646 |
| 2 | Top Points | 0.9000 | 0.9184 | 0.8600 | 0.8903 |
|   |   | $F_C = 0.9100$ | | $F_C = 0.8770$ | |

Table 3.6 illustrates the initial accuracy of the 2D synthetic data. The leave one out cross validation method is labeled "Train". The testing of the additionally generated 1000 data points is labeled (1000). The calculations performed are defined in equations (15), (16) and (17).

Figure 14:
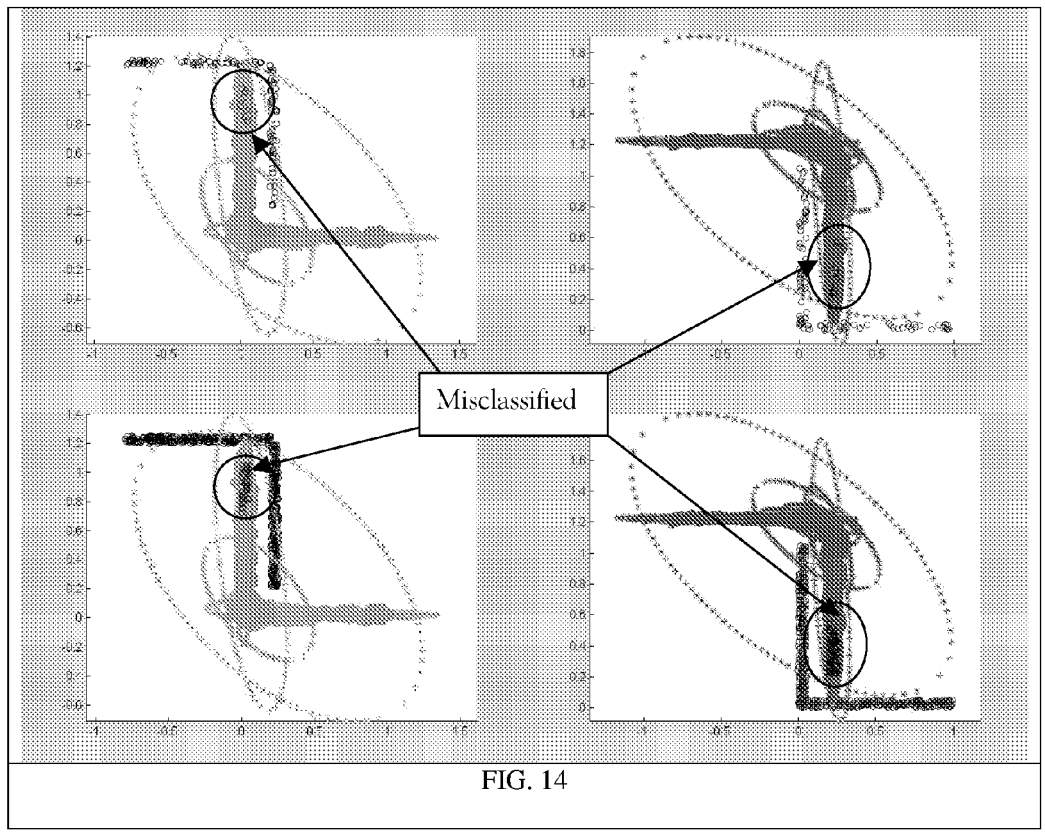
FIG. 14 illustrates misclassified data from the cluster ellipses of FIG. 13.

Although, the initial clusters from path 2 seemed to qualitatively produce better generalization than those initially produced from path 1, this assessment did not translate into improved classification accuracy. Therefore, the relative qualitative assessment of class generalization ascertained from the figures cannot be translated in terms of relative estimation accuracy. The clusters for each class displayed in FIG. 13 are redisplayed in FIG. 14 with the locations of their misclassified instances highlighted. FIG. 13 illustrates overlap of all the cluster ellipses initially formed with k-Means clustering to represent class one (bottom instances (FIG. 8) generalized by clusters on left) and class two (top instances (FIG. 8) generalized by clusters on right). FIG. 14 illustrates overlap of all the cluster ellipses initially formed to represent class one (bottom instances (FIG. 8) generalized by clusters on left) and class two (top instances (FIG. 8) generalized by clusters on right). The class one instances that their generalizing clusters did not properly classify (left) and the class two instances that their generalizing clusters did not properly classify (right) are shown. The top row represents the leave one out training (200 instances) results and the bottom row the testing (1000 instances) results. Note that as before, the training instances that were misclassified effectively predict the locations for the test instances that were misclassified.

The first three steps of the process for eliminating excess clusters resulted in weeding out unnecessary clusters that contributed toward generating misclassifications. As in path 1, the maximum misclassification level shown in FIG. 4 was set to the highest misclassification level. These steps resulted in a modest change in the number of clusters used as shown in Table 3.7 below, whereas the corresponding change in accuracy levels is illustrated in Table 3.8 below.

| Class | Binary Classification | Initial Clusters | After EEC3 |
|---|---|---|---|
| 1 | Bottom Points | 97 | 96 |
| 2 | Top Points | 102 | 100 |

Table 3.7 illustrates the number of clusters generated for each class after the third step of the process for eliminating excess clusters compared to the initial number of clusters for the 2D synthetically generated data using Repetitive k-Means clustering.

| Class | Binary Classification | $F_{D\backslash H}^{i}$ Train | $F_{H\backslash D}^{i}$ Train | $F_{D\backslash H}^{i}$ (1000) | $F_{H\backslash D}^{i}$ (1000) |
|---|---|---|---|---|---|
| 1 | Bottom Points | 1.0 | 1.0 | 1.0 | 0.9881 |
| 2 | Top Points | 1.0 | 1.0 | 0.9880 | 1.0 |
|  |  | $F_C = 1.0$ |  | $F_C = 0.9940$ |  |

Table 3.8 illustrates synthetic 2D data accuracies after the third step of the process for eliminating excess clusters when using Repetitive k-Means clustering. The leave one out cross validation method is labeled "Train". The testing of the additional 1000 data points is labeled (1000). The calculations performed are defined in equations (15), (16) and (17).

Figure 15:
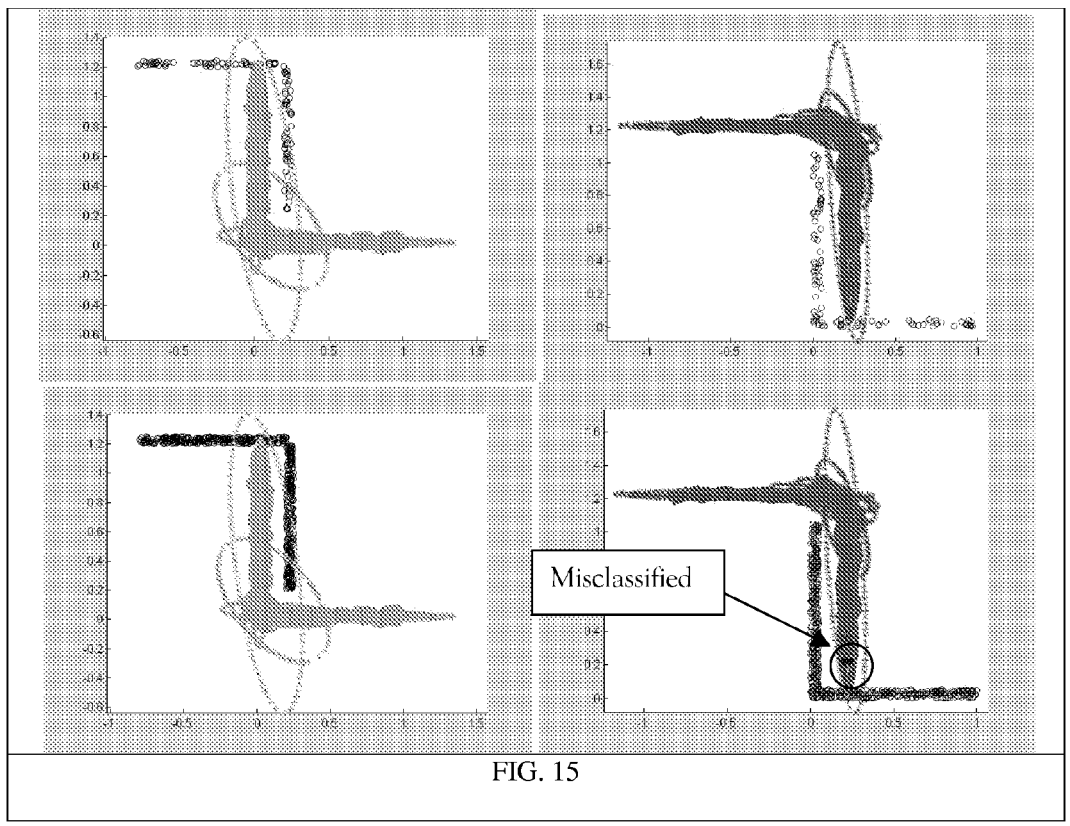
FIG. 15 illustrates misclassified data from the cluster ellipses of FIG. 14 with leave one out cross validation.

The remaining clusters for each class are displayed in FIG. 15 with the locations of the misclassified test instances highlighted. FIG. 15 illustrates overlap of all the cluster ellipses initially formed to represent class one (bottom instances (FIG. 8) generalized by clusters on left) and class two (top instances (FIG. 8) generalized by clusters on right). The class two instances that their generalizing clusters did not properly classify (right) are shown. The top row represents the leave one out training (200 instances) results and the bottom row the testing (1000 instances) results. No misclassifications were made during leave one out cross validation on the training instances. All of the test instances of class one were successfully identified and six instances of class two were misclassified. Notice that after the third step of the process of eliminating excess clusters none of the training instances were misclassified during leave one out cross validation and when classifying the 1000 unknown test instances of class one, therefore those plots do not have any misclassified instance regions highlighted.

The fourth and final step is to eliminate any excess correct classification clusters. The final number of clusters after the fourth step of the process of eliminating excess clusters is displayed in Table 3.9 below.

| Class | Binary Classification | Initial Clusters | After EEC3 | Final Clusters |
|---|---|---|---|---|
| 1 | Bottom Points | 97 | 96 | 2 |
| 2 | Top Points | 102 | 100 | 3 |

Table 3.9 illustrates the final number of clusters retained after the fourth and final step of the process for eliminating excess clusters for both classes compared to those after the third step of the process for eliminating excess clusters as well as the initial number of clusters generated for the 2D synthetic data.

Note that the numbers of clusters was reduced extensively. This step does not change the leave one out accuracy level predictions, but can alter the remaining 1000 point accuracies realized. These results are displayed in Table 3.10 below.

| Class | Binary Classification | $F_{D\backslash H}^{i}$ Train | $F_{H\backslash D}^{i}$ Train | $F_{D\backslash H}^{i}$ (EEC3) (1000) | $F_{H\backslash D}^{i}$ (EEC3) (1000) | $F_{D\backslash H}^{i}$ (EEC4) (1000) | $F_{H\backslash D}^{i}$ (EEC4) (1000) |
|---|---|---|---|---|---|---|---|
| 1 | Bottom Points | 1.0 | 1.0 | 1.0 | 0.9881 | 0.9980 | 0.9727 |
| 2 | Top Points | 1.0 | 1.0 | 0.9880 | 1.0 | 0.9720 | 0.9979 |
|  |  | $F_C = 1.0$ |  | $F_C = 0.9940$ |  | $F_C = 0.9850$ |  |

Table 3.10 illustrates synthetic 2D data accuracies after the fourth and final step of the process for eliminating excess clusters realized on the additional 1000 instances. The leave one out cross validation method is labeled "Train" and the testing of the remaining 1000 data points after the third step of the process for eliminating excess clusters. The calculations performed are defined in equations (15), (16) and (17).

Figure 16:
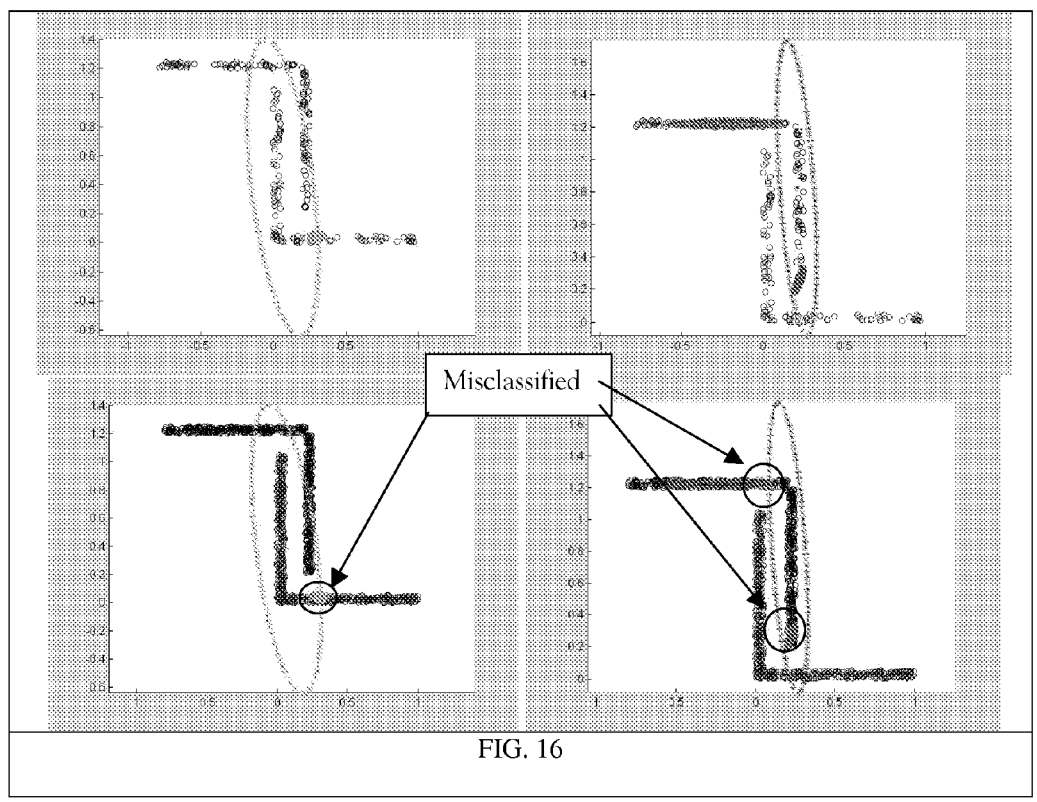
FIG. 16 illustrates overlap of cluster ellipses of FIG. 15 after a final elimination process.

Unlike the previous results, the final elimination of clusters resulted in a degradation of the accuracy for the test points. This indicates that the simple process proposed for the final stage of the eliminating clusters process can result in an oversimplification of the class and has room for improvement. The remaining clusters for each class are displayed in FIG. 16 with the locations of the misclassified test points highlighted. FIG. 16 illustrates the cluster ellipses formed after the final step in the process of elimination of excess clusters to represent class one (bottom instances (FIG. 8) generalized by clusters on left) and class two (top instances (FIG. 8) generalized by clusters on right). The class one instances that their generalizing clusters did not properly classify (left) and the class two instances that their generalizing clusters did not properly classify (right) are shown. The top row represents the leave one out training (200 instances) results and the bottom row the testing (1000 instances) results. No misclassifications were made during leave one out cross validation on the training instances. As after the third step of the process for eliminating excess clusters, no training instances were misclassified during leave one out cross validation after the fourth step of the process for eliminating excess clusters. The over generalization due to the excessively large clusters retained is mainly responsible for the additional misclassified test instances shown.

The training process methodology described above was performed on the synthetically generated two dimensional data after Repetitive k-Means Clustering. As in the example of path 1, when one went through the various steps a visual understanding of how the generalization of the classes was improved and simplified by the algorithm was shown. The example of path 2 further illustrated that the simple process for eliminating excess clusters of the methodology can result in an oversimplification of the class and has room for improvement. The results of both path examples show that the clustering technique chosen can affect the generalization and classification accuracy of the algorithm. However, based on the 2D data it appears that the Repetitive k-Means clustering is competitive with EDCBSC. Therefore, one may anticipate that using Repetitive k-Means Clustering can greatly reduce the computational burden of the algorithm without critically degrading its classification accuracy.

The foregoing description of various embodiments of the invention has been presented for purposes of illustration and description. It is not intended to be exhaustive or to limit the invention to the precise forms disclosed, and obviously many modifications and variations are possible in light of the above teaching. The exemplary embodiments, as described above, were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. A device comprising:
    a sensor operable to sense target events;
    a processor in communication with said sensor, said processor operable to organize target training event data into a plurality of clusters of target event data based on target event similarities, each cluster of said plurality of clusters being described by a mean vector and a covariance matrix, said processor operable to determine relevant features of each cluster, to logically exclude a portion of the plurality of clusters and to assign unknown target data events in the closest cluster based on a normalized distance, said target training event data comprises a plurality of target training event instances, each target training event instance of said target training event data corresponding to more than one cluster of said plurality of clusters; and
    a classifier in communication with said processor, said classifier operable iteratively to rank said each target training event data instance by the normalized distance, to identify a misclassification level of clusters with incorrectly organized target event training instances, to identify an excess correctness of clusters with excess correctly organized target event training instances, and to eliminate clusters with one of a misclassification level and an excess correctness without increasing classifications errors, said classifier operable to provide a user with classification information.

2. The device of claim 1, wherein said processor is further operable to utilize an estimated covariance matrix that spans less than the entire space of the cluster of target event data.

3. The device of claim 2, wherein said processor is operable to determine relevant features of each cluster by identifying dominant eigenvectors.

4. The device of claim 3, wherein said processor is operable to identify dominant eigenvectors by determining whether eigenvalues are larger than expected noise in a direction.

5. The device of claim 2, wherein the event similarities with which said processor is operable to organize target training event data into a plurality of clusters of target event data based on target event similarities include Euclidean distance between target events.

6. The device according to claim 1, wherein said processor is operable to organize target training event data using one of Euclidean Distance with Contiguous Breaks Supervised Clustering and Repetitive k-Means Clustering.

* * * * *